United States Patent
Ylönen et al.

(10) Patent No.: US 6,731,641 B1
(45) Date of Patent: May 4, 2004

(54) PROCESSING OF SIGNALLING MESSAGES IN ATM NODE

(75) Inventors: Timo Ylönen, Espoo (FI); Juha Seppänen, Helsinki (FI); Tero Tossavainen, Helsinki (FI); Janne Tuomisto, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/464,944

(22) Filed: Dec. 16, 1999

Related U.S. Application Data

(63) Continuation of application No. PCT/FI98/00562, filed on Jun. 26, 1998.

(30) Foreign Application Priority Data

Jun. 27, 1997 (FI) .................................................. 972800

(51) Int. Cl.[7] .............................................. H04L 12/28
(52) U.S. Cl. ................. 370/397; 370/241.1; 370/395.1; 370/399; 370/409; 370/474
(58) Field of Search .......................... 370/241.1, 395.1, 370/395.51, 395.52, 395.53, 395.61, 395.63, 395.64, 395.65, 399, 409, 410, 469, 426, 522, 397, 474, 476

(56) References Cited

U.S. PATENT DOCUMENTS

| | | | | |
|---|---|---|---|---|
| 5,812,550 A | * | 9/1998 | Sohn et al. .................. | 370/395 |
| 5,867,677 A | * | 2/1999 | Tsukamoto .................. | 395/311 |
| 5,982,749 A | * | 11/1999 | Daniel et al. ................ | 370/233 |
| 6,430,189 B1 | * | 8/2002 | Juntumaa et al. ........... | 370/399 |

FOREIGN PATENT DOCUMENTS

| | | | | |
|---|---|---|---|---|
| EP | 0 355 797 | * | 2/1990 | .......... H04L/12/56 |
| EP | 0 472 408 | | 2/1992 | .......... H04L/12/56 |
| EP | 0 518 199 | | 12/1992 | .......... H04L/12/56 |
| EP | 0 788 288 | | 8/1997 | .......... H04Q/11/00 |
| EP | 0 800 324 | | 10/1997 | .......... H04Q/11/04 |
| GB | 2 296 621 | | 7/1996 | .......... H04Q/11/04 |

* cited by examiner

*Primary Examiner*—Dang Ton
*Assistant Examiner*—Shick Hom
(74) *Attorney, Agent, or Firm*—Squire, Sanders & Dempsey L.L.P.

(57) ABSTRACT

According to the invention, an ATM switch is used for returning signalling cells to their input side and to an apparatus which is located there for processing signalling cells and which performs SAR functions. The apparatus (56) processing signalling cells is connected to the ATM layer circuit (52) using a UTOPIA interface according to the standard. Seen from the ATM layer circuit, the processing apparatus does not hereby in any way differ from those physical layer circuits (PHY) connected to it through the UTOPIA interface which connect the optical fibres to the ATM node. Through the ATM switch (52) the signalling cells circulate back to the input side, and in the output buffer a modification of cell heading is done wherein the VPI/VCI data is replaced with a tag of that physical circuit through which the signalling cell has arrived and the old tag is replaced with a new tag by which the ATM layer circuit directs the modified signalling cells through the UTOPIA interface to the apparatus processing signalling cells.

6 Claims, 3 Drawing Sheets

PROCESSING OF SIGNALLING MESSAGES IN ATM NODE

This is a continuation of application Ser. No. PCT/FI98/00562, filed Jun. 26, 1998.

FIELD OF THE INVENTION

The invention concerns transmission and reception of signalling cells in the node, especially an ATM node, of a broad-band telecommunications network.

BACKGROUND OF THE INVENTION

As is known, ATM (Asynchronous Transfer Mode) is a connection-oriented packet switching technique chosen by the ITU-T, the international standardisation organisation in the telecommunications field, as the "target solution" for a broad-band multiservice network (B-ISDN). Information is transferred in the cells shown in FIG. 1, which include a 5-bit heading and a 48-bit information part. The heading fields include the VPI (Virtual Path Indicator) and the VCI (Virtual Channel Indicator), the Payload Type, the CLP (Cell Loss Priority) and the HEC heading error check with which errors of one bit can be corrected and errors of two bits can be detected.

The standard dimensions of cells allow their swift connection. Cells belonging to different connections are separated from each other with the aid of the VPI and VCI indicators. When setting up a connection, a fixed route or virtual connection is determined through the network along which the cells of the connection will be routed. In network nodes, the cells are connected according to their VPI/VCI values. The VPI/VCI values of cells are connection space specific and will thus generally change together with the connection of the VP or VC level. When the information transfer ends, the connection is disconnected.

FIG. 2 illustrates a reference model of B-ISDN connection practices, wherein the functions are divided on the one hand into layers and on the other hand into levels.

The physical layer PHY includes two partial layers, of which partial layer PM contains transfer system specific bit level tasks while the transfer system convergence layer TC attends to adapting of cells into each transfer system and to cell bounding, to heading error check of the cell and to equalisation of the cell rate.

The ATM layer offers a cell transfer service to the AAL layer. It deals only with the cell heading and its tasks are cell connection, multiplexing and de-multiplexing, cell heading generation and removal and flow control (GFC) at the UNI (User Network Interface).

The AAL (ATM Adaptation Layer) segments the frames of upper layers, places the segments in cells and again assembles the frames at the opposite end.

The user plane attends to data transfer of user applications and to the control required therein. In principle, processing of the data of this level takes place in the user's terminal equipment only. The control plane includes telephone and connection control functions and functions related to processing of the related signalling. This level is present in those network elements only which provide connection-related services or take part otherwise in the processing of signalling.

Of the management plane divided into two parts the tasks of layer management include management of the resources and parameters of the connection practice items of its own layer as well as management of the OAM cells relating to the structural use and maintenance of the ATM layer. It is the task of plane management to co-ordinate between different levels and to manage the system as a whole.

The interface between the integrated circuits performing functions of the physical layer PHY and the ATM layer has been standardised by the ATM Forum under the names of UTOPIA, An ATM-PHY. Interface Specification, Level 1, hereinafter the abbreviation UTOPIA1 will be used, and UTOPIA, An ATM-PHY Interface Specification, Level 2, hereinafter UTOPIA2. In practice, the ATM equipment must be implemented with commercially available ATM micro circuits, which implement an interface in accordance with the UTOPIA specification. The interface has become a de facto industrial standard which is complied with by all component suppliers making integrated ATM circuits. In the UTOPIA interface, the data is defined as 8-bit or 16-bit data depending on the actual bit rate (UTOPIA level 1 and level 2). Only ATM data is transferred in the interface and it contains the control or so-called handshaking required in two-way transfer. Circuit manufacturers implement the functions of the ATM layer as masters of their circuits, because the UTOPIA specification defines the ATM layer circuits as masters and because the manufacturers can not know in what kind of environment their customers will use the circuits. Correspondingly, the circuits of the physical layer are slaves. Slaves connected to a UTOPIA bus may communicate with the master equipment only, but not with one another.

In an ATM network, OAM cells relating to the operation and maintenance of the ATM layer are transferred from one node to another and inside the node. In addition, signalling messages may be sent over lines in the same way as is also done in a narrow-band ISDN network, although due to packet switching there is less need for signalling. Signalling on ATM lines is a rather new matter and is only now beginning to be a feature of products. Signalling may end at the node, whereby the signalling cell comes and remains in the node, or of the transit type, whereby it is relayed through the node. Performance of signalling requires implementation of the so-called SAR (Segmentation and Reassembly) function belonging to the ATM adaptation layer, which makes it possible to add signalling cells to the cell flow and to separate them from the cell flow. The SAR functions used and the ATM adaptation layer are controlled by a processor.

It is a problem with processing of signalling cells how the processor will have access to the cell flow of ATM lines in practice. If one SAR card is used, how it will be able to send signalling messages to any line and to receive messages from any line.

One way of solving the problem of signalling messages exchange between the subscriber equipment and the ATM node is presented in Patent Application EP-0355797, applicant Hitachi Ltd. The principle of this solution is shown in FIG. 3. Optical subscriber lines are connected to the ATM switchswitch through subscriber line interfaces. They perform the conversion between the optical and electric signals and also add/remove cell headings. Corresponding trunk line interfaces are located on the other side of the ATM switchswitch. One bus on the trunk line side of the switchswitch, bus 41, is reserved solely for signalling channels. This line is connected to line signalling apparatus 42, which performs assembling of the payload data of ATM cells into a signalling message data frame and, correspondingly, segmentation of the data frame and its locating in the ATM cells, that is, the function of layer 3 in FIG. 2. The function corresponds to the SAR function. Processor 43 attends to processing of the message. The function is such that when a signalling cell arrives from the subscriber line, the subscriber line interface identifies the signalling cell, modifies its heading to address bus 41, that is, line signalling apparatus 42, and adds such information to the heading which indicates from which subscriber line the cell has come. In the opposite direction, the line signalling apparatus segments the data frame into cells, adds such information to cell headings which indicates for which subscriber line and for which subscriber equipment the cell is intended. The subscriber line interface receives the signalling cell and also performs an address modification for it before it is sent to the subscriber line.

The described patent application also presents an embodiment carrying out transmission of signalling messages to trunk lines and reception from them. The embodiment is shown in FIG. 4. By adding the trunk line signalling apparatus 43 on the subscriber line side of the ATM switchswitch it is possible to receive signalling cells from trunk lines and to send them to trunk lines. The solution is practicable, because signalling on a subscriber line is different from signalling on a trunk line as regards protocol stacks.

The described known method is characterised in that signalling cells arriving from a trunk line and from a subscriber line are led through an ATM switchswitch, they are released on its other side and the data is processed there, and in that outgoing signalling cells are formed on this same side and are again led through the ATM switch and further to the trunk line or subscriber line. The processing of signalling cells is thus performed in a centralised fashion in one place.

It is an advantage of this known method that centralised signalling processing can be performed with an efficient processor, whereby the signalling software may also be huge. However, it would be advantageous in some applications to perform signalling on the same side of the ATM switch as the one from which signalling cells arrive and to which they should be sent. This could of course be done in such a way that signalling is performed in a decentralised fashion, whereby there would be separate signalling processing for each line. However, this would lead to a considerably increased need for processing compared with the centralised method. The known method also requires separate signalling processes on either side of the ATM switch, if signalling should be done in both directions from the node. Another drawback of the presented method is that it is not flexibly modular. If changes are made in the number of lines, then changes must be made in the centralised signalling unit. Even though the method presents a solution to signalling on lines, not only their signalling must be performed but also an internal signalling in the ATM node as a separate process from line signalling. Internal signalling must be carried out with buses between cards, which is a very demanding method which also increases the costs. When using the known method, switching into the ATM cell flow must be made already in the line signalling apparatus, and it is very demanding and difficult to carry this out in practice.

The present invention aims at a method and switching arrangement making it possible to meet the need for signalling in either direction from the ATM node using in the minimum case just one line signalling apparatus. It should be possible with the arrangement to perform both line signalling and signalling inside the node.

The established objective is achieved with the attributes defined in the independent claims.

SUMMARY OF THE INVENTION

The invention is based on the idea to use an ATM switch to return signalling cells to their input side and to the apparatus for processing signalling cells which is located there and which performs SAR functions. According to the invention, the signalling cell processing apparatus is connected to a circuit in the ATM layer using a standard UTOPIA interface. When seen from the ATM layer circuit, the processing apparatus does not hereby differ in any way from those physical layer circuits connected to it through the UTOPIA interface which connect the optical fibres with the ATM node. Signalling cells arriving from the line are identified in the ATM layer circuit by the heading, they are picked out from the cell flow and a physical circuit tag is added to them to indicate from which input line they have arrived. Thereupon they are transmitted to the ATM switch which connects the cells to the output buffer. In the output buffer, cell headings are modified to replace the VPI/VCI information with the tag of that physical circuit, through which the signalling cell has arrived, and the old tag is replaced with a new tag, by which the ATM layer circuit will direct modified signalling cells through the UTOPIA interface to the signalling cell processing apparatus. Other cells coming from the switch have a normal VPI/VCI heading and the tag of the target physical circuit, so the ATM layer circuit is able to direct them by way of the UTOPIA interface to the correct physical circuit, which will transmit them further to the optical fibre.

In a similar manner, the signalling cell processing apparatus forms a response message by placing its data in new modified signalling cells. Instead of the VPI/VCI values it provides them with the address of the target physical apparatus and directs them through the UTOPIA interface to the ATM layer circuit. This will add before the modified signalling cell a tag indicating the cell source. The cell thereupon goes through the ATM switch to the output gate, which again modifies the cell into a signalling cell according to the standard by placing instead of the address of the physical apparatus a standard VPI/VCI value identifying the signalling cell and by replacing the old tag with a new tag by which the cell is directed over the UTOPIA interface to the correct physical apparatus, which transmits it further to the optical fibre.

The processing unit may receive signalling cells from either side of the ATM switch and irrespective of whether the signalling cells pass through the user network interface (UNI) or through the network—network interface (NNI).

In this way, signalling cells are circulated through the ATM switch, so the connection into the cell flow is done already at the ATM level using already existing node circuits.

DETAILED DESCRIPTION OF THE DRAWINGS

The invention will be described in greater detail with the aid of the appended schematic drawings, of which FIG. 1 shows fields of an ATM cell;

DETAILED DESCRIPTION OF THE INVENTION

Figure 1:
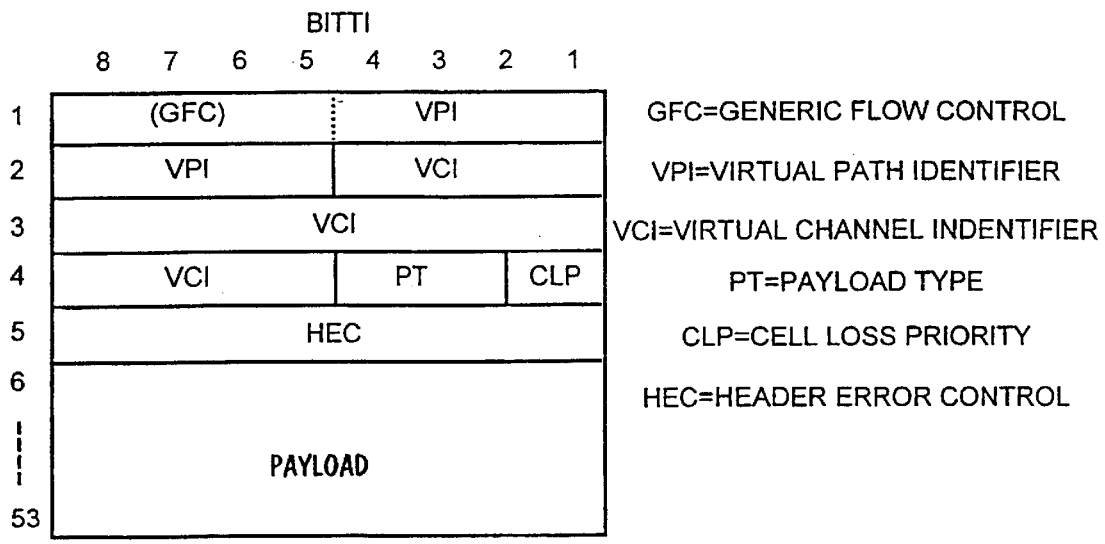
Figure 2:
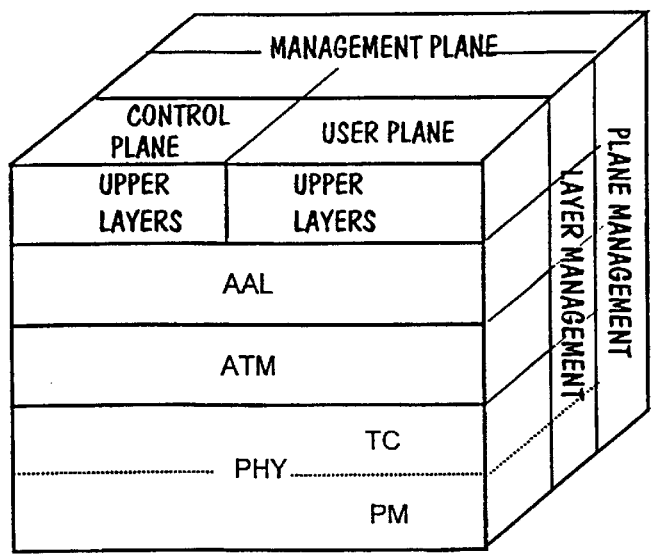
FIG. 2 depicts a reference model of an ATM system.
Figure 3:
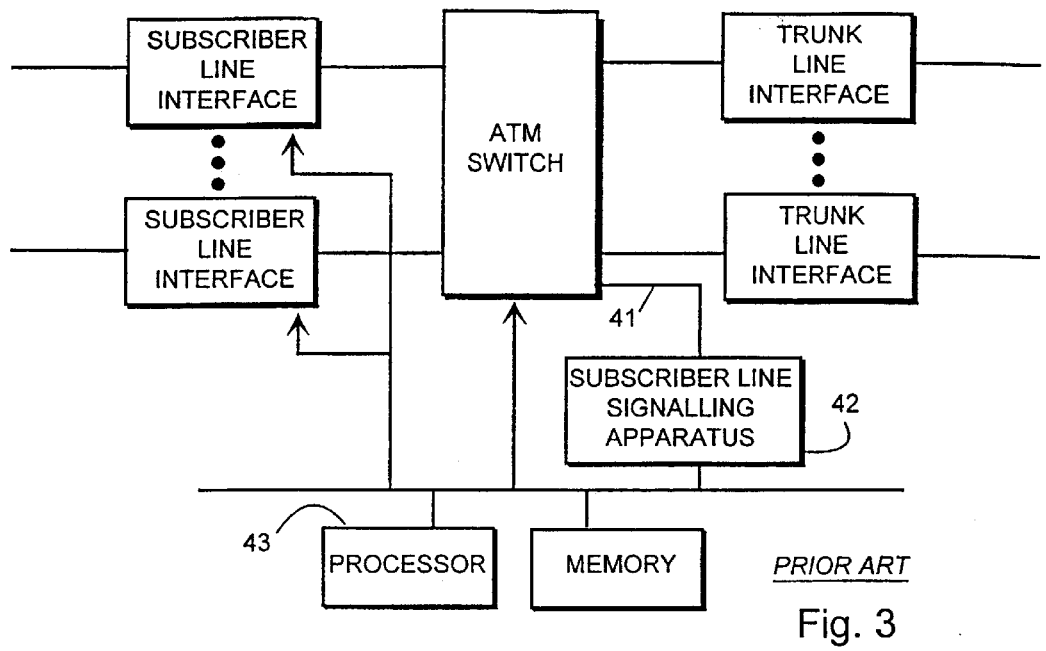
FIGS. 3 and 4 show a known signalling cell method.
Figure 4:
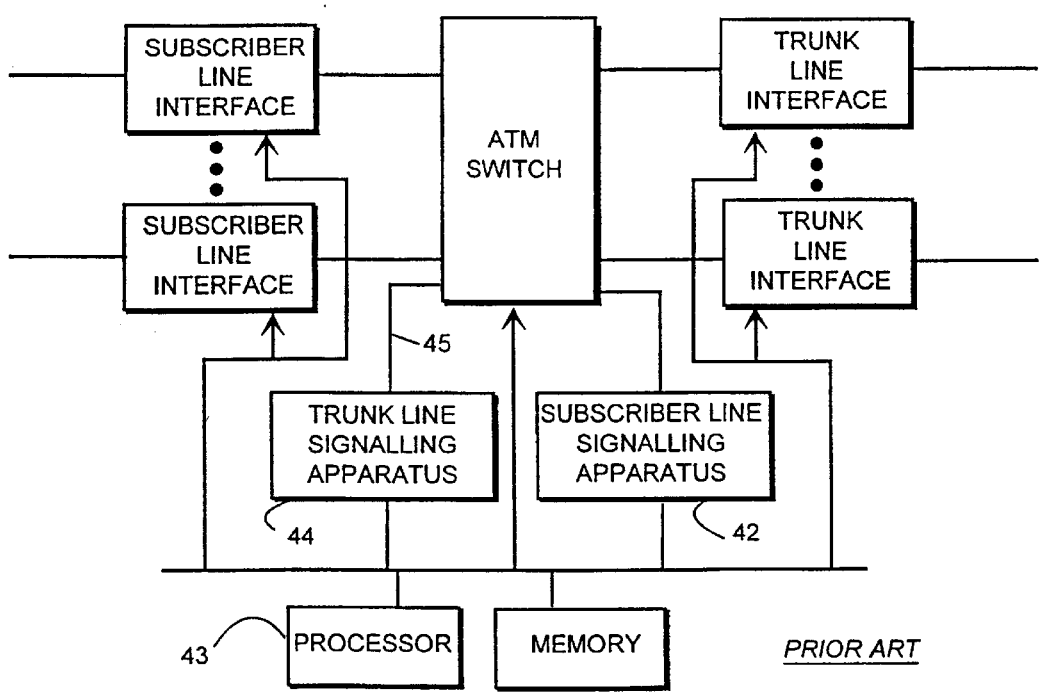
Figure 5:
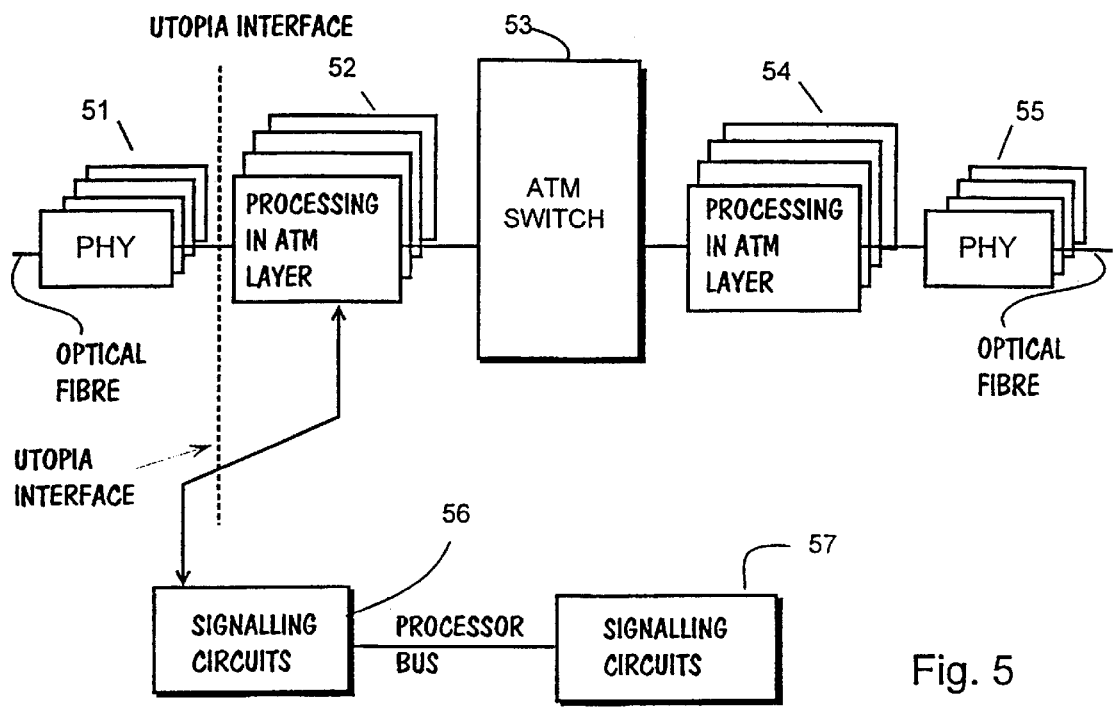
FIG. 5 shows the basic principle of the invention.

According to FIG. 5, the line signalling apparatus 56 performing signalling, including the SAR function forming the cell payload into a data frame and correspondingly the data frame into cells, is located in such a way before the ATM switch 53 that it connects into the processing units located in the ATM layer. The line signalling apparatus communicates with circuits 52 performing ATM layer functions using a standard UTOPIA interface. Four PHY circuits are drawn in the figure, which indicates that there are four STM-1 (Synchronous Transport Module) connections on one circuit card. The STM-1 is a known basic structure for data transfer which is used in the synchronous digital hierarchy SDH. The bit rate with this basic frame is 155–520 kbit/s. In practice, the number of connections on one card is limited by the rather great space demanded by optical connections.

Processing of signalling messages is performed by processor 57. Line signalling apparatus 56 uses a processor bus to communicate with processor 57. When the connection of the line signalling apparatus with PHY circuits and ATM layer circuits is over the UTOPIA interface, this gives much freedom for locating the line signalling apparatus, that is, for how and where signalling is done. This apparatus performing the SAR function and the processor may thus be located e.g. on one PHY circuit card 51, on a separate card, whereby no separate ATM line connections are needed, or a separate line signalling apparatus together with processor may be located on each PHY card, whereby the signalling functions are decentralised. A cheaper processor may hereby be used.

The connection shown in the figure has the following simplified function. Arriving from optical line A a signalling cell, which may be a cell of the UNI or Nni type, arrives at PHY card 51 terminating this line and modifying the cell into electric form and sending it to ATM layer circuit 52, which sends the cell to an input buffer in the ATM switch. Thence the yard switches it further to an output gate on the other side of the yard. In the output gate the VPI/VCI values in the heading field of the cell are studied. The VPI/VCI values reserved for certain purposes are tabled fixedly in the standard ITU-T I.361 B-ISDN ATM Layer Specification. The table lists the values reserved for OAM signalling cells of different types as well as the values reserved for general and point-to-point signalling respectively. When it is noticed in the output gate that the VPI/VCI values indicate the cell to be a signalling cell, a modification is performed, wherein the VPI/VCI value is replaced with a tag of the line signalling apparatus 56. The cell is returned to the ATM switch, which directs the cell back to the other side of the yard to ATM layer circuit 52, which directs the cell further over the UTOPIA interface to line signalling apparatus 56.

Figure 6:
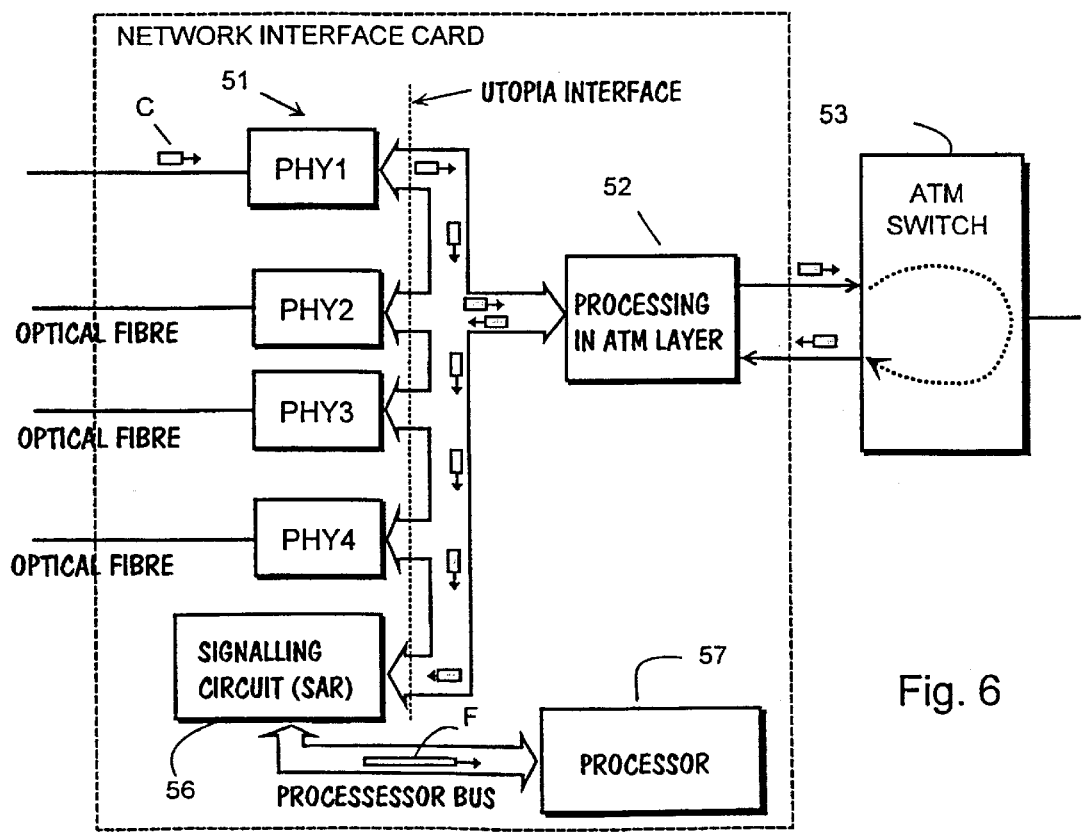
FIG. 6 shows the propagation of signalling cells.

The above description is much simplified. With the aid of FIG. 6 a closer description will be given of what will happen to the signalling cell and to its heading as the cell propagates from the input line to the line signalling apparatus.

In the connection shown in the figure, one Network Interface circuit card has four PHY circuits PHY1 . . . PHY4, a line signalling apparatus 56, a processor 57 and an ATM layer processing circuit 52. Since the ATM layer processing circuit 52 sees the PHY circuits and the line signalling apparatus 56 over the UTOPIA interface, it need not know anything about the existence of line signalling apparatus 56, but it sees five PHY circuits as it were. This makes it easy to add the arrangement according to the invention to an ATM node. The passage of ATM cell C coming from an optical fibre will be studied. The cells are marked with a grey rectangle, where an arrow indicates the direction of propagation. The cell may be of the UNI type, of the NNI type or of the OAM type.

When the optical signal has reached the PHY 1 circuit, it first modifies it into electric form and then sends it to the UTOPIA bus. ATM layer circuit 52 receives the cell and processes its heading fields. The ATM layer circuit acts as a host in relation to the PHY circuit, so always when receiving a cell from the bus it will also know from which PHY the cell was sent. ATM layer circuit 52 adds a tag to the received cell to indicate from which PHY circuit the cell has arrived, in this example the tag indicates that the cell has arrived from the PHY 1 circuit. Thereupon ATM circuit 52 sends the cell together with its tag to ATM switch 53.

The switch examines the VPI/VCI values of the ATM cell in the input buffer and based on this examination it performs a connection to the correct output buffer. In this case, the output buffer is on the same side of the yard as the input buffer. The connection takes place according to the VPI/VCI value of the cell's heading. Since the optical fibres on the terminating card are 4 PHY circuits in the case shown as an example, each of which may have connections with the same VPI/VCI value at the same time, the VPI/VCI value as such is not sufficient switching information for the switch, but it must also necessarily be known from which PHY circuit, that is, from which optical fibre, the cell has arrived. This information it gets from the tag added to the cell by the ATM circuit. In the output gate the ATM switch performs on cells addressed to the following nodes an address modification in the known manner, wherein the old VPI/VCI is replaced with a new VPI/VCI value. Since according to the standard the signalling cells can be easily distinguished from other cells by their VPI/VCI values, the matter is arranged in such a way at the output gate that the VPI/VCI value of the signalling cell is not after all replaced with a new value, but the old VPI/VCI value is instead replaced with the tag of PHY 1. The original tag of the cell referring to PHY1 is replaced with a new tag referring to line signalling apparatus 56. The cell heading thus contains the fields "Tag of line signalling apparatus+PHY tag". It should be noted that after the performed modifications the signalling cell is no longer in accordance with the standard, because its heading is no longer in accordance with the definition of signalling cells in the standard.

After the address modification and tag replacement, the ATM switch sends the modified signalling cell from its output buffer to that same Network Interface card from which the cell arrived. The ATM layer circuit 52 on the card receives the signalling cell from the bus. The circuit examines the tags of the cells received and directs the cells to the target indicated by the tag. Thus the modified signalling cells, that is, those cells, which have a line signalling apparatus tag, are directed into line signalling apparatus 56. Since the heading of these cells also contains a tag of that PHY which received the said signalling cell from the optical line, line signalling apparatus 56 is able to distinguish from arriving signalling cells the cells sent by each PHY circuit into their own group and to assemble those cells from the group which belong to the same signalling message. In this manner it is possible also to distinguish the signalling cells coming from the PHY1 circuit in the figure.

The operation in the line signalling apparatus is mainly on known principles. Its SAR function separates the payload from the received signalling cells, that is, from those sent by the PHY1 circuit, and adds them one after another into the data frame until all those cells have been received which belong to the message sent as cells. Upon completion of the data frame F of the message, line signalling apparatus 56 sends the frame through the processor bus to processor 57 for processing.

It is obvious from the above description how signalling cells pass from the line signalling apparatus to the correct PHY circuit and further to the optical fibre. When the processor has processed the message and formed a response message, it sends it as a data frame through the processor bus to line signalling apparatus 56. Its SAR function segments the message and locates each segment in its own cell. It does not put any standard VPI/VCI value in the signalling cell, but instead uses the PHY circuit tag, in this example the tag of PHY1. The line signalling apparatus sends the signalling cells it has formed to the UTOPIA bus. ATM layer processing circuit 52, which of course knows that the cells it has received originate in line signalling apparatus 56, adds a tag to the cell which states the cell source. Hereupon it sends the cell to the ATM switch.

In the switch the signalling cell of the response message goes through the yard along the same route as the signalling cell of the signalling message, but in the opposite direction. At the output gate of the yard an address modification is performed, where the tag of line signalling apparatus 56 in the cell is replaced with a standard VPI/VCI value of the signalling cell. In the modification, the tag identifying line signalling apparatus 56 is also replaced with a new tag, which is the tag of PHY1 in this example. The cell heading now contains the fields "identifying tag of PHY1+VPI/VCI according to standard". The signalling cell is now in accordance with the standard. After these steps, the ATM switch sends the cell from the output buffer to that Network Interface card of the cell, which contains the target PHY1.

The ATM layer processing circuit 52 on the card receives the signalling cell belonging to the response message and examines its address fields. It notices the tag referring to the PHY1 circuit, so being the host in regard to this circuit it sends the signalling cell through the UTOPIA bus to the said PHY1 circuit. After receiving the signalling cell, PHY1 modifies it into an optical form and sends it to an optical fibre.

The proposed circulation of signalling cells through an ATM switch can be implemented fairly straightforwardly and it has several advantages. Each PHY circuit implementing the physical connection has equal access to the line signalling apparatus and thus to the performance of the SAR function. From the viewpoint of the node the connection management does not differ in signalling and user connections. In addition, signalling may when required use the whole band width of the UTOPIA bus, although the PHY circuits will of course suffer from this. The statistics-keeping and monitoring functions of the node may be utilised also as regards signalling.

Keeping within the attributes of the claims, the invention may also be embodied otherwise than in the above example, wherein each Network Interface card has a line signalling apparatus with its SAR functions. Only one line signalling apparatus, e.g. located on a separate card, may be used just as well together with its efficient processor, which would attend to all signalling.

What is claimed is:

1. Method of transferring signaling cells between a circuit performing a physical layer function, and an apparatus processing and forming signaling cells in a broadband telecommunications system, comprising the steps of:

providing an ATM switch including several input gates and several output gates;

performing connection to the output gate of a signaling cell led to the input gate;

providing ATM circuits which perform ATM layer functions and are connected functionally to the ATM switch and which process cell headings;

providing physical layer circuits performing physical layer functions and each of which is connected on the one hand through an interface to the ATM circuits and on the other hand to a transmission line;

providing a connection to the apparatus processing and forming signaling cells through the same interface to the ATM circuits, whereby the ATM circuits can see the apparatus processing and forming signaling cells as if they were a physical circuit;

transferring signaling cells through the ATM switch between the physical layer circuits and the apparatus processing and forming signaling cells;

modifying, in the output gate of the ATM switch, a first normal signaling cell arriving from the physical layer circuits into a modified signaling cell by replacing the information (VPI/VCI) identifying the first normal signaling cell with a first tag individualizing a physical layer circuit of said physical layer circuits and by adding a second tag indicating that the modified signaling cell must be led to the apparatus;

modifying, in the output gate of the ATM switch, the modified signaling cell arriving from the apparatus into a second normal signaling cell by replacing the first tag of the modified signaling cell with information (VPI/VCI) identifying the cell as a normal signaling cell and by adding a third tag indicating that the second normal signaling cell must be led to the physical layer circuit of said physical layer circuits and performing the physical function.

2. Method as defined in claim 1, wherein the step of adding the second tag is carried out by replacing the first tag that is added to the signaling cell by the ATM circuit performing ATM layer functions and that individualizes the physical layer circuit of said physical layer circuits.

3. Method as defined in claim 1, wherein the step of adding the third tag is carried out by replacing the first tag of the modified signaling cell with information (VPI/VCI) identifying the cell to be a normal signaling cell and by replacing the second tag with a third tag individualizing a physical layer circuit of said physical layer circuits and performing the physical function.

4. Method as defined in claim 1, wherein the signaling cell is a cell arriving from the transmission line.

5. Method as defined in claim 1, wherein the signaling cell is a cell to be transferred within the ATM node.

6. Method as defined in claim 1, wherein the signaling cell is an Operation, Administration & Maintenance (OAM) cell according to standard.

* * * * *